(12) United States Patent
Schacht

(10) Patent No.: US 10,696,341 B1
(45) Date of Patent: Jun. 30, 2020

(54) THEFT DETERRENT SKEWER SYSTEMS AND METHODS FOR BICYCLES

(71) Applicant: Stefan Richard Schacht, Bellingham, WA (US)

(72) Inventor: Stefan Richard Schacht, Bellingham, WA (US)

( * ) Notice: Subject to any disclaimer, the term of this patent is extended or adjusted under 35 U.S.C. 154(b) by 204 days.

(21) Appl. No.: 15/368,597

(22) Filed: Dec. 3, 2016

Related U.S. Application Data

(60) Provisional application No. 62/262,664, filed on Dec. 3, 2015.

(51) Int. Cl.
*B62H 5/00* (2006.01)
*F16B 41/00* (2006.01)
*E05B 71/00* (2006.01)
*B62K 25/02* (2006.01)

(52) U.S. Cl.
CPC ............ *B62H 5/001* (2013.01); *B62K 25/02* (2013.01); *E05B 71/00* (2013.01); *F16B 41/005* (2013.01); *B62K 2206/00* (2013.01)

(58) Field of Classification Search
CPC . E05B 71/00; B62H 5/001; F16B 2/02; F16B 2/18; F16B 2/185; F16B 41/005; B60B 27/026; B62K 25/02; B62K 2206/00; B62K 2025/025
USPC ................. 70/233, 201, 225, 229, 230, 261; 301/124.2; 403/374.5
See application file for complete search history.

(56) References Cited

U.S. PATENT DOCUMENTS

| | | | | | |
|---|---|---|---|---|---|
| 4,724,692 | A | * | 2/1988 | Turin | B62H 5/001 70/204 |
| 4,964,287 | A | * | 10/1990 | Gaul | B62H 5/001 224/924 |
| 5,005,390 | A | * | 4/1991 | Giannini | B60R 9/10 70/202 |
| 5,022,672 | A | * | 6/1991 | Kawai | B62H 5/001 280/281.1 |
| 5,319,992 | A | * | 6/1994 | Shui-Te | G05G 5/06 16/438 |
| 5,479,836 | A | * | 1/1996 | Chang | B62H 5/001 70/201 |
| 5,526,661 | A | * | 6/1996 | Lin | B62H 5/001 301/110.5 |
| 6,202,458 | B1 | * | 3/2001 | Buchalter | B62H 5/001 301/110.5 |

(Continued)

OTHER PUBLICATIONS

Zefal, Lock'N Roll, http://www.zefal.com/en/locking-pins/93-lock-n-roll.html, no date, 4 pages.

*Primary Examiner* — Lloyd A Gall
(74) *Attorney, Agent, or Firm* — Michael R. Schact; Schact Law Office, Inc.

(57) ABSTRACT

A skewer assembly for securing a component to a first portion of a bicycle has a bolt, a housing, and a first lock member. The bolt detachably attaches the component to the first portion of the bicycle. The housing is supported relative to the bolt. The first lock member supported by the housing such that: when the skewer assembly is in an upright orientation, the first lock member inhibits tightening of the bolt; and when the skewer assembly is at least partly displaced from the upright orientation, the first lock member is displaced to allow tightening of the bolt.

19 Claims, 14 Drawing Sheets

(56) References Cited

U.S. PATENT DOCUMENTS

| | | | | |
|---|---|---|---|---|
| 6,910,356 B2* | 6/2005 | Price | ............... | E05B 15/1614 |
| | | | | 70/358 |
| 7,866,193 B2* | 1/2011 | Tribout | ............... | B62H 5/001 |
| | | | | 301/124.2 |
| 8,261,585 B2* | 9/2012 | Kotlizky | ............... | B62K 25/02 |
| | | | | 301/110.5 |
| 8,281,625 B2* | 10/2012 | Prescott | ............... | B60R 9/048 |
| | | | | 211/5 |
| 8,646,299 B2* | 2/2014 | Sloth | ............... | E05B 27/0014 |
| | | | | 70/358 |
| 2002/0026816 A1* | 3/2002 | Katsouros | ............... | B62H 5/001 |
| | | | | 70/233 |
| 2008/0115547 A1* | 5/2008 | Chang | ............... | B62H 5/001 |
| | | | | 70/233 |

* cited by examiner

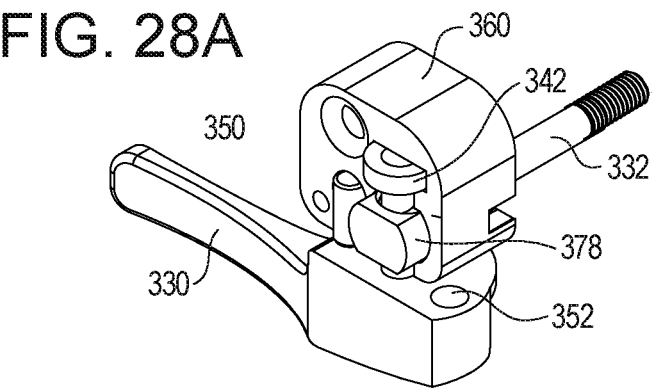
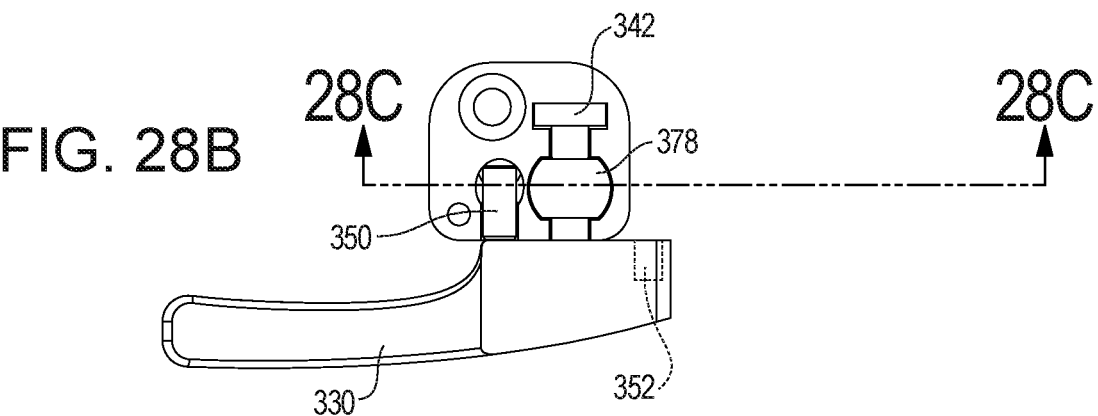
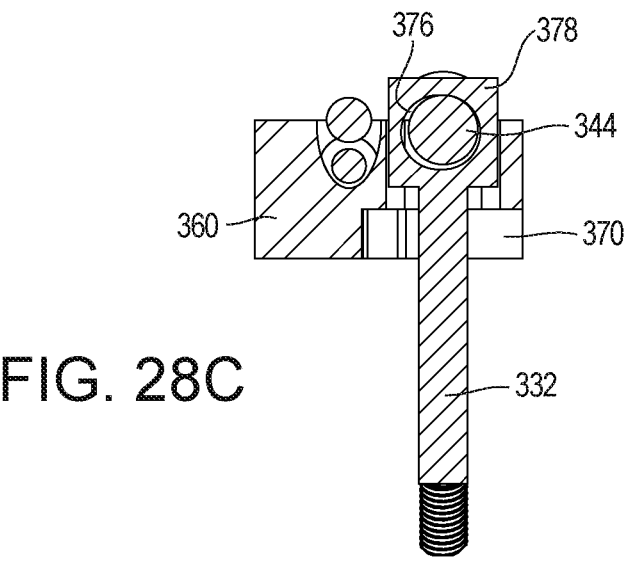

THEFT DETERRENT SKEWER SYSTEMS AND METHODS FOR BICYCLES

RELATED APPLICATIONS

The present application U.S. patent application Ser. No. 15/368,597 filed Dec. 3, 2016 claims priority of U.S. Provisional Patent Application Ser. No. 62/262,664, filed Dec. 3, 2015, the contents of which are incorporated herein by reference.

TECHNICAL FIELD

The present invention relates to skewer systems and methods for bicycles and, in particular, to skewer systems and methods that deter theft of components of the bicycle.

BACKGROUND

Bicycles typically have a frame, a seat supported by the frame, a fork, a front wheel supported by the fork, and a rear wheel supported by dropouts formed in the frame. Each wheel of a modern bicycle typically comprises a hub, a rim, one or more spokes extending from the hub to the rim, and a tire supported by the rim. An inflated inner tube is typically arranged between the rim and tire such that the tire is resiliently spaced from the rim. A skewer assembly is typically used to secure the front wheel to the fork and the rear wheel to the frame. The seat of a modern bicycle system comprises a saddle and a seat post. The frame defines a seat tube that receives the seat post. A skewer assembly may be used to tighten a clamp assembly on the seat tube to secure the seat post such that the saddle is at a desired position relative to the frame.

For a variety of reasons, one or more components of a bicycle may require modification or replacement. For example, the inner tube may become damaged during normal operation of the bicycle. When the inner tube is damaged, it must be removed for repair or replacement. As another example, the rider may adjust the height of the bicycle seat at a first position when riding uphill and a second position when riding downhill.

To facilitate removal, repair, adjustment, and/or replacement of bicycle components, modern bicycle components are typically removably supported from the bicycle fork and/or frame by one or more skewer assemblies. One type of skewer assembly, referred to herein as a simple bolt skewer assembly, comprises a bolt and nut. A simple bolt skewer assembly may be arranged between the fork and/or dropouts to support the hub of the wheel. A simple bolt skewer assembly may also be arranged to tighten the seat tube clamp. A simple bolt skewer assembly requires a tool to loosen the bolt assembly. Conventionally, a hex key or other conventional tool may be used to loosen the bolt assembly of a simple bolt type skewer assembly. Another type of skewer assembly, referred to herein as a quick release skewer assembly, comprises a lever to facilitate tightening and loosening of the bolt assembly. A quick release skewer assembly allows removal of a bicycle component simply by operating the lever and without the use of a tool. In particular, the lever defines a cam surface that tightens the bolt and nut as the lever is rotated into a closed position relative to the bolt.

Both simple bolt and quick release skewer assemblies simplify removal of the bicycle component to the extent that theft of bicycle components is a substantial problem. In particular, typical bicycle locks are configured to secure the frame to a fixed structure such as a bike rack or the like. Often, however, components such as the wheels and/or seat are not secured to the fixed structure by the lock, and the wheels and/or seat may easily be stolen while leaving the bicycle frame in place.

One approach to inhibiting theft of bicycle wheels using a simple bolt type skewer assembly is to modify the bolt such that a special tool is required to loosen the bolt assembly. Instead of a conventional hex key or wrench, a keyed tool is required to rotate the nut. Without the appropriate keyed tool, rotation of the bolt assembly is sufficiently difficult to deter theft under many situations. However, the keyed tool must be available for use any time the bicycle component must be removed or adjusted. If the keyed tool is misplaced or forgotten, replacement or adjustment of the bicycle component may be difficult if not impossible until a new tool is obtained from the manufacturer.

Another approach to inhibiting theft of bicycles is to modify the nut portion of the skewer assembly. As an example, the nut may be provided with a rounded or conical surface that inhibits securing of the nut to a tool for rotating the nut. Such modified nuts prevent the rotation of the nut relative to the bolt under most conditions and but do not prevent rotation of the bolt.

The need exists for improved systems and methods for locking bicycle components relative to the frame and/or fork of the bicycle.

SUMMARY

The present invention may be embodied as a skewer assembly for securing a component to a first portion of a bicycle comprising a bolt, a housing, and a first lock member. The bolt detachably attaches the component to the first portion of the bicycle. The housing is supported relative to the bolt. The first lock member supported by the housing such that: when the skewer assembly is in an upright orientation, the first lock member inhibits tightening of the bolt; and when the skewer assembly is at least partly displaced from the upright orientation, the first lock member is displaced to allow tightening of the bolt.

The present invention may also be embodied as a method of securing a component to a portion of a bicycle comprising the following steps. A bolt for detachably attaching the component to the first portion of the bicycle is provided. A housing is supported relative to the bolt. A first lock member is supported with the housing. The skewer assembly is arranged in an upright orientation such that the first lock member inhibits tightening of the bolt. The skewer assembly is at least partly displaced from the upright orientation such that the first lock member is displaced, thereby allowing tightening of the bolt.

The present invention may be embodied as a bicycle assembly comprising a frame, a fork, a front wheel, a rear wheel, and first, second, and third bolts. The first bolt detachably attaches the front wheel to the fork. The second bolt detachably attaches the rear wheel to the frame. The third bolt detachably attaches the seat to the frame. At least one housing is supported relative to at least one of the first bolt, the second bolt, and the third bolt. A first lock member is supported by the at least one housing such that: when the bicycle assembly is in an upright orientation, the first lock member inhibits tightening of the bolt; and when the bicycle assembly is at least partly displaced from the upright orientation, the first lock member is displaced to allow tightening of the bolt.

DESCRIPTION OF DRAWING

FIG. 28A is a perspective view of the third example lock system with a housing cap thereof removed to illustrate the primary and tertiary lock members thereof in a fourth configuration when the fourth example skewer system is fully inverted and the lever is in the open position;

FIG. 28B is front elevation view similar to FIG. 28A; and

FIG. 28C is a section view taken along lines 28C and 28C in FIG. 28B.

DETAILED DESCRIPTION OF EXAMPLES OF THE INVENTION

The principles of the present invention may be embodied in different forms and using different combinations of components. Several examples of skewer assemblies constructed in accordance with, and embodying, the principles of the present invention will be described below.

I. First Example Skewer Assembly

Figure 1:
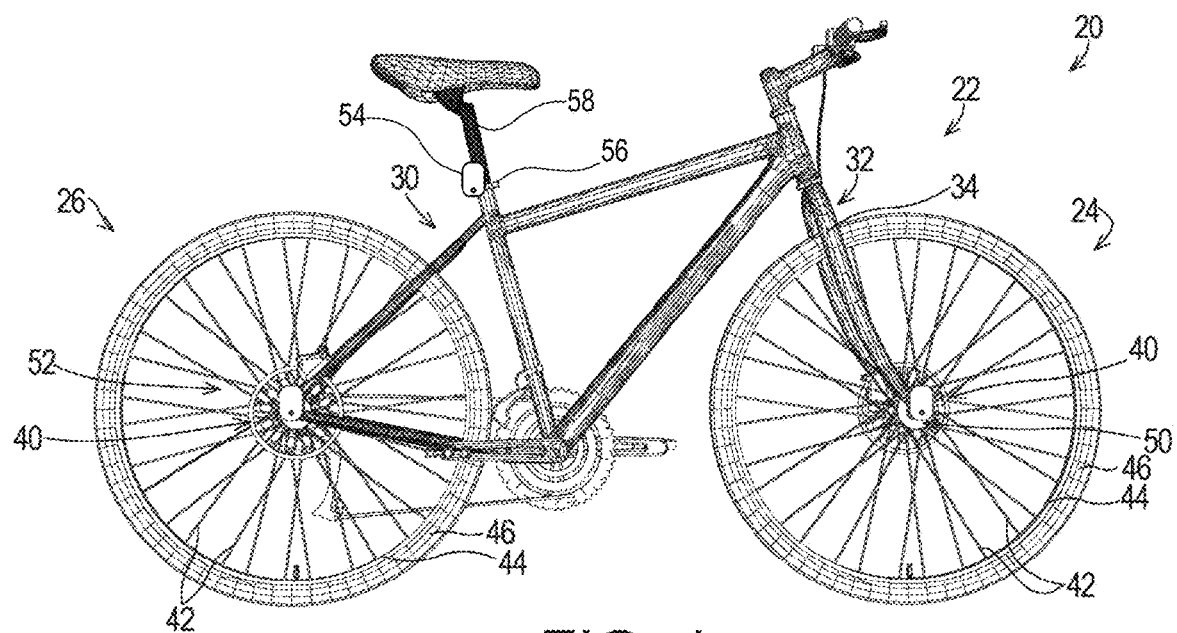
FIG. 1 is a side elevation view of an example bicycle employing a first example lock system of the present invention.
Figure 2:
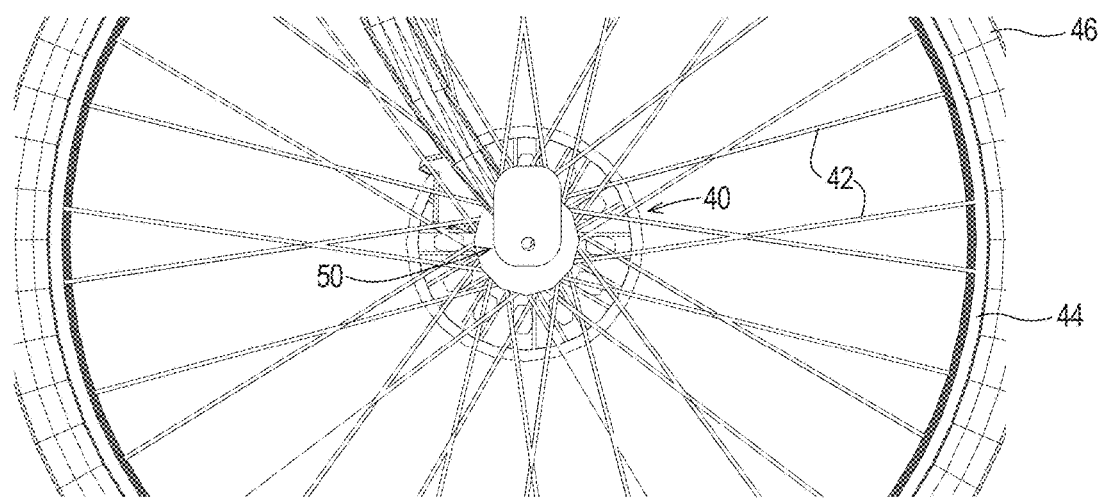
FIG. 2 is a detail of a portion of the bicycle depicted in FIG. 1.
Figure 4A:
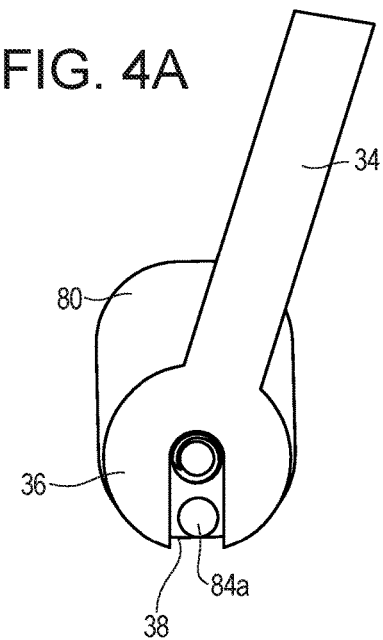
FIGS. 4A and 4B are section views depicting interaction of the first example lock system with the bicycle depicted in FIG. 1.
Figure 4B:
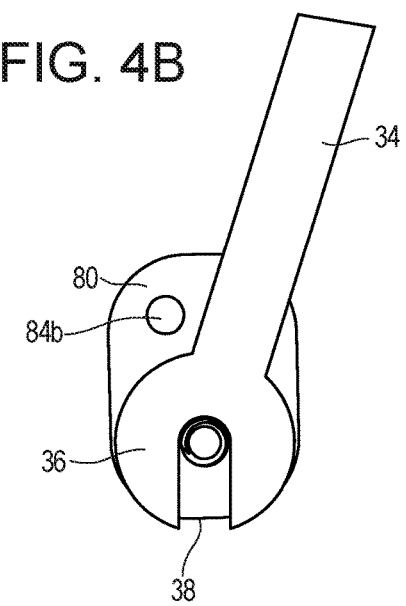

FIG. 1 illustrates a bicycle 20 comprising a frame assembly 22, a front wheel assembly 24, and a rear wheel assembly 26. As is conventional, the frame assembly 22 comprises a main frame 30 and a fork 32 and the fork comprises at least one blade 34. FIGS. 4A and 4B illustrate that each blade 34 defines a drop out 36 defining an axle notch 38. A similar drop out and axle notch are formed in the main frame 30 for the rear wheel assembly 26 but are not visible in the drawing. The example wheel assemblies 24 and 26 each comprise a hub 40, spokes 42, a rim 44, and a tire 46. The spokes 42 extend between the hub 40 and rim 44, and the rim 44 supports the tire 46. The frame assembly 22 and wheel assemblies 24 and 26 are or may be conventional and will not be described in detail beyond what is helpful for a complete understanding of the present invention.

FIG. 1 further illustrates that a front skewer assembly 50 connects the front wheel assembly 24 to the fork 32, that a rear skewer assembly 52 connects the rear wheel assembly 26 to the main frame 30, and that a seat skewer assembly 54 engages a clamp structure 56 for clamping a seat post 58 relative to the main frame 30. The front, rear, and seat skewer assemblies may be similar or different. The example front, rear, and seat skewer assemblies 50, 52, and 54 are all the same and embody a first example skewer assembly of the present invention. For brevity, only the front skewer assembly 50 and the engagement of the skewer assembly 50 with the fork 32 will be described herein in detail. One of ordinary skill in the art will understand that the rear skewer assembly 52 will engage the drop out in the main frame 30 and that the seat skewer assembly 54 will compress portions of the clamp structure 56 in a manner similar to the manner in which the front skewer assembly 52 engages the fork 32.

Figure 3:
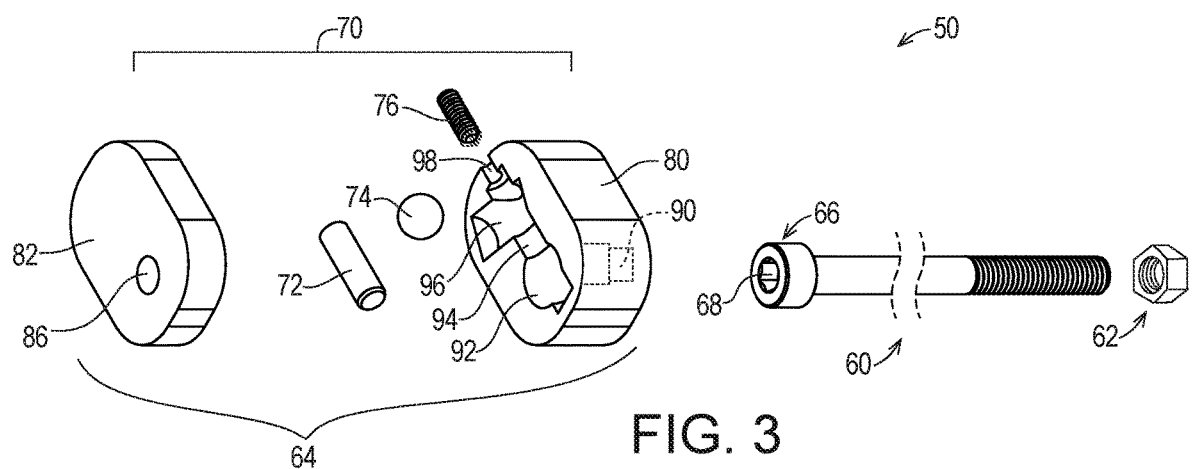
FIG. 3 is an exploded view of skewer assembly incorporating the first example lock system.

FIG. 3 illustrates that the example front skewer assembly 50 comprises an axle bolt 60, an axle nut 62, and a lock assembly 64. The axle bolt 60 defines a head portion 66 in which is formed a hex cavity 68. The example seat skewer assembly 54 will include a clamp bolt instead of the axle bolt 60, and the clamp bolt will typically be sized and dimensioned for the particular clamp structure 56 defined by the example bicycle 20.

FIG. 3 further illustrates that the example lock assembly 64 comprises a housing 70 and a primary lock member 72. The example primary lock member 72 is a cylindrical member. Optionally, the example lock assembly 64 may also be provided with one or both of a secondary lock member 74 and a tertiary lock member 76. The example secondary lock member 74 is a sphere or ball, and the example tertiary lock member 76 is a set screw. In this example, a diameter of a sphere forming the example secondary lock member 74 is smaller than a diameter of a cylindrical member forming the example primary lock member 72. The example housing 70 comprises a housing base 80 and a housing cap 82. At least one base projection 84a (FIG. 4A) or 84b (FIG. 4B) extends from the housing base 80. An access opening 86 is formed in the housing cap 82.

When the housing base 80 and housing lid 82 are secured together, the example housing 70 defines a through hole 90, a head cavity 92, a primary cavity 94, a secondary cavity 96, and a threaded hole 98. The example through hole 90 and head cavity 92 are cylindrical and coaxially aligned. The example primary cavity 94 is cylindrical and defines a primary axis A that intersects the head cavity 92 at substantially a right angle to the axis of the head cavity 92. A diameter of the example primary cavity 94 is slightly larger than the diameter of the primary lock member 72. The secondary cavity 96 defines a secondary axis B that is coplanar with and intersects the primary axis A at an intersection angle and at a location spaced from the head cavity 93. The diameter of the example secondary cavity 96 is slightly larger than a diameter of the example secondary lock member 74. The diameter of the example secondary lock member 74 is, however, larger than a diameter of the primary cavity 94 so that the secondary lock member 74 may not move within the primary cavity 94 along the primary axis A. The threaded hole 98 is also aligned with the primary axis A.

Figure 5:
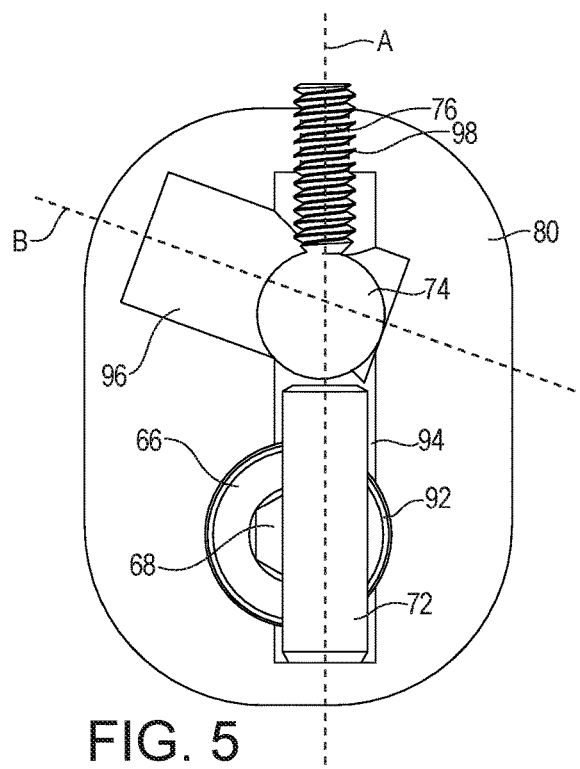
FIGS. 5-8 are side elevation views with a housing cap removed depicting a method of using the first example lock system.

In use, the axle bolt 60 is arranged to extend through the through hole 90 with the head portion 66 within the head cavity 92. The example primary lock member 72 is arranged for sliding movement within the primary cavity 94. When held in a primary locked position (e.g., by gravity) as shown in FIG. 5, the primary lock member 72 covers at least a portion of the hex cavity 68 in the head portion 66. With at least a portion of the hex cavity 68 in the head portion 66 covered, a suitable tool may not be inserted into the head cavity 92. Accordingly, when the skewer assembly 50 in general and the lock assembly 64 in particular are upright (e.g., in an upright orientation), access to the head portion 66 and removal of the wheel assembly 24 from the fork 32 is inhibited.

Figure 7:
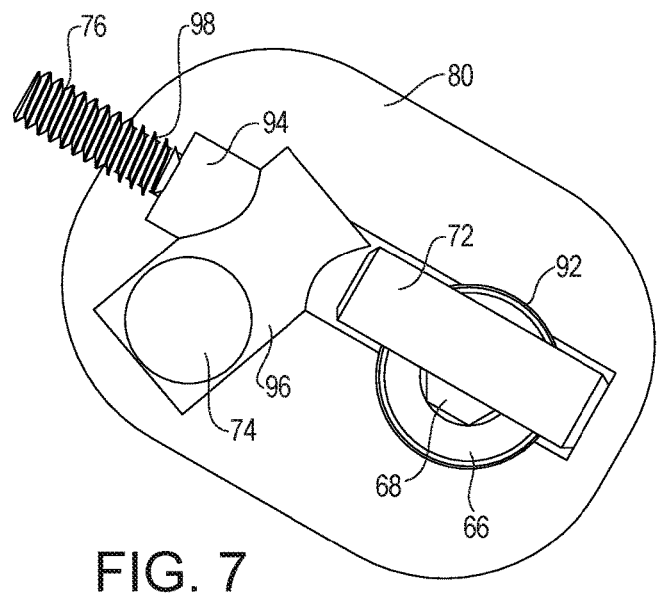
Figure 8:
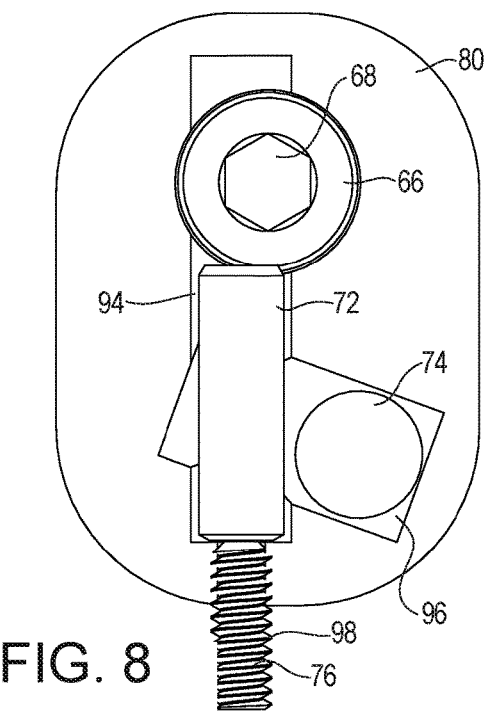

As shown for example in FIGS. 7 and 8, rotating or at least partly inverting the example housing 70 allows the example primary lock member 72 to be moved from the primary locked position (FIG. 7) to a primary unlocked position (FIG. 8). In the primary unlocked position, the primary lock member 72 allows access to the hex cavity 68. In particular, with the primary lock member 72 in the primary unlocked position, a hex wrench may be inserted through the access hole 86 in the housing cap 82 to engage the hex cavity 68. As shown in FIGS. 4A and 4B, the housing projections 84a and 84b extend from the housing base 80 to engage the blade 34 or the adjacent drop out 36 (or, in the case of the rear wheel assembly 26, a portion of the main frame 30 adjacent to the drop out defined thereby) to prevent rotation of the housing 70 about the longitudinal axis of the axle. An orientation of the housing 70 is thus predetermined relative to an orientation of the bicycle 20.

Accordingly, only by at least partly inverting the bicycle 20 and thus the housing 70, one or more tools may be used to allow the axle bolt 60 and axle nut 62 to be rotated relative to each other to loosen the front skewer assembly 50 and thus allow removal of the front wheel assembly 24 from the fork 32. If the bicycle 20 cannot be inverted for some reason (e.g., chained to a bike rack), the primary lock member 72 prevents access to the hex cavity 68 and thus inhibits removal of the front wheel assembly 24.

The example secondary lock member 74 is arranged for rolling movement within the secondary cavity 96. With the primary lock member 72 in the primary locked position, the secondary lock member 74 may be arranged (e.g., by gravity) in a secondary locked position (FIG. 5) in which the secondary lock member 74 prevents movement of the primary lock member 72 out of the primary locked position. If a bump or shock causes upward movement of the housing 70 and thus an upward force on the primary lock member 72, the secondary lock member 74 will engage the housing 70 to prevent movement of the primary lock member 72 entirely out of the primary locked position such that access to the hex cavity 68 is still not allowed. When in the secondary locked position, the secondary lock member 74 thus maintains the primary lock member 72 within the primary locked position when subjected to unintentional or intentional bumps or shocks. However, as the bicycle 20 is inverted, the secondary locked member 74 will move from the secondary locked position (FIG. 6) to a secondary unlocked position (FIG. 7) such that continued inversion of the bicycle 20 eventually allows the primary lock member 72 to move from the primary locked position to the primary unlocked position as described above. The intersection location and angle defined by the primary and secondary axes A and B are selected to require the secondary lock member 74 to move with rotation or inversion of the housing 70 from the secondary locked position to the secondary unlocked position before the primary lock member 76 is allowed to move from the primary locked position to the primary unlocked position.

Figure 6:
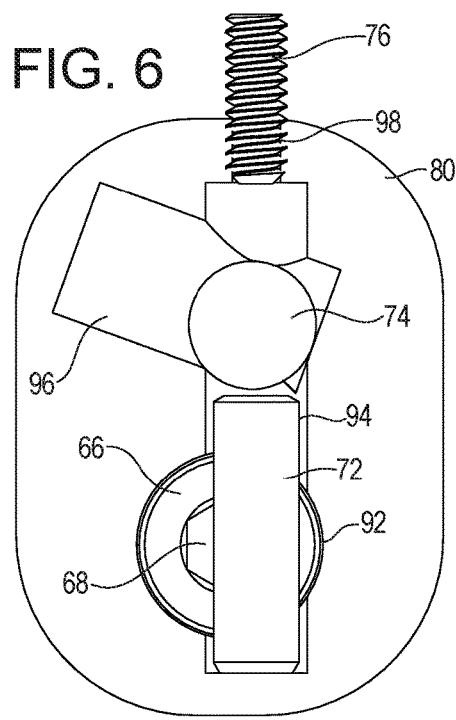

The example tertiary lock member 76 is threaded into the threaded hole 98 for movement along the primary axis A. With the primary lock member 72 in the primary locked position and the secondary lock member 74 in the secondary locked position, the tertiary lock member 76 may be axially rotated for displacement into in a tertiary locked position (FIG. 5) in which the tertiary lock member 76 prevents movement of the secondary lock member 74 out of the secondary locked position. The tertiary lock member 76 embodied as a conventional set screw is axially rotated using a screw driver or the like to move the tertiary lock member 76 from the tertiary locked position (FIG. 5) to a tertiary unlocked position (FIG. 6). When tightened into the tertiary locked position, the tertiary lock member 76 positively holds the secondary lock member 74 in the secondary locked position and, in turn, the primary lock member 72 in the primary locked position. When backed away from the tertiary locked position into the tertiary unlocked position, the secondary lock member 74 may move from the secondary locked position into the second unlocked position as described above.

As mentioned above, both the secondary lock member 74 and the tertiary lock member 76 are optional, and at least a portion of the benefit of the first example skewer assemblies 50, 52, and 54 may be obtained without the use of the secondary and/or tertiary lock members 74 and 76. In addition, the first example skewer assemblies 50, 52, and 54 may be constructed with the tertiary lock member 76 and without the secondary lock member 74. In this case, the tertiary lock member 74 directly engages the primary lock member 72 instead of engaging the primary lock member 72 through a secondary lock member.

II. Second Example Skewer Assembly

Figure 9:
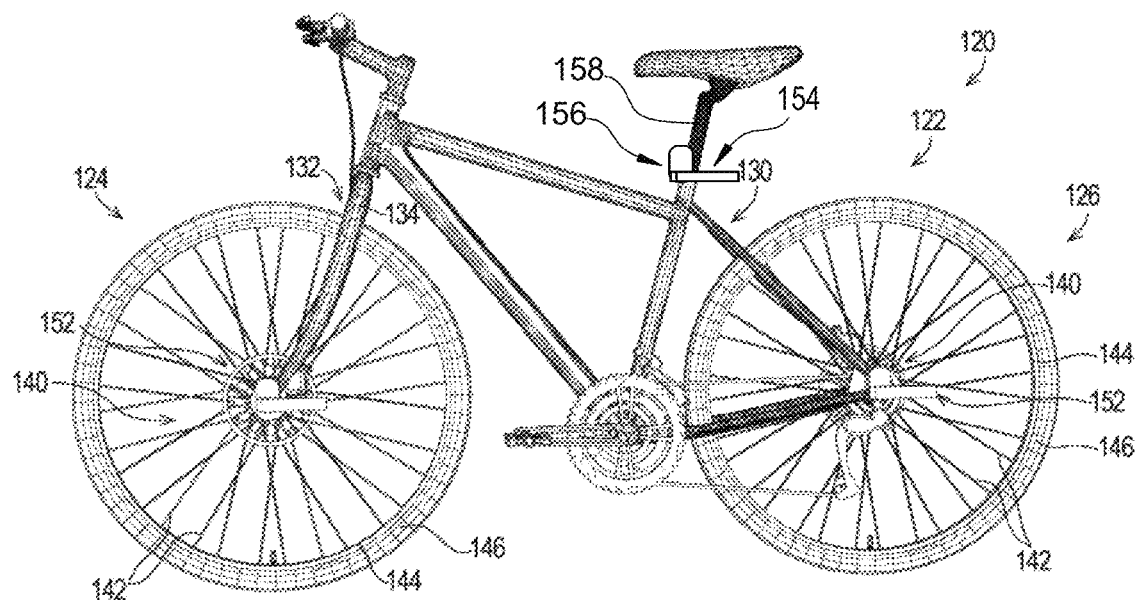
FIG. 9 is a side elevation view of an example bicycle employing a second example lock system of the present invention.
Figure 10:
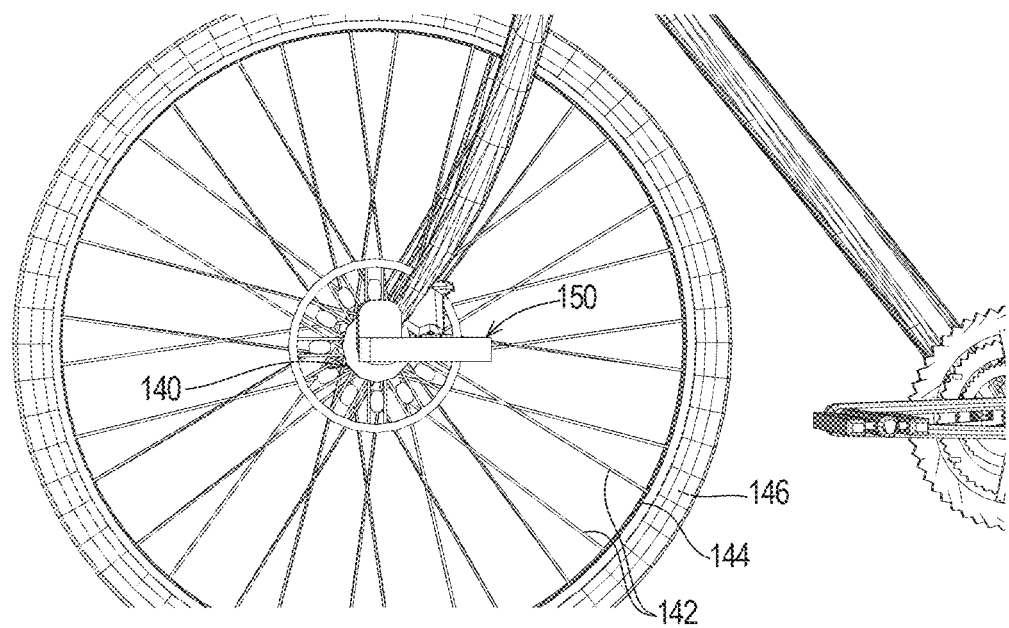
FIG. 10 is a detail of a portion of the bicycle depicted in FIG. 9.

FIG. 9 illustrates a second example bicycle 120 comprising a frame assembly 122, a front wheel assembly 124, and a rear wheel assembly 126. As is conventional, the frame assembly 122 comprises a main frame 130 and a fork 132 and the fork comprises at least one blade 134. As with each of the blades 34 described above, each blade 134 defines a drop out (not shown) defining an axle notch (not shown). A similar drop out and axle notch are formed in the main frame 130 for the rear wheel assembly 126. The example wheel assemblies 124 and 126 each comprise a hub 140, spokes 142, a rim 144, and a tire 146. The spokes 142 extend between the hub 140 and rim 144, and the rim 144 supports the tire 146. The frame assembly 122 and wheel assemblies 124 and 126 are or may be conventional and will not be described in detail beyond what is helpful for a complete understanding of the present invention.

FIG. 9 further illustrates that a front skewer assembly 150 connects the front wheel assembly 124 to the fork 132, that a rear skewer assembly 152 connects the rear wheel assembly 126 to the main frame 130, and that a seat skewer assembly 154 engages a clamp structure 156 for clamping a seat post 158 relative to the main frame 130. The front, rear, and seat skewer assemblies may be similar or different. The example front, rear, and seat skewer assemblies 150, 152, and 154 are all the same and embody a second example skewer assembly of the present invention. For brevity, only the front skewer assembly 150 and the engagement of the skewer assembly 150 with the fork 132 will be described herein in detail. One of ordinary skill in the art will understand that the rear skewer assembly 152 will engage the drop out in the main frame 130 and that the seat skewer assembly 154 will compress portions of the clamp structure 156 in a manner similar to the manner in which the front skewer assembly 152 engages the fork 132.

Figure 11:
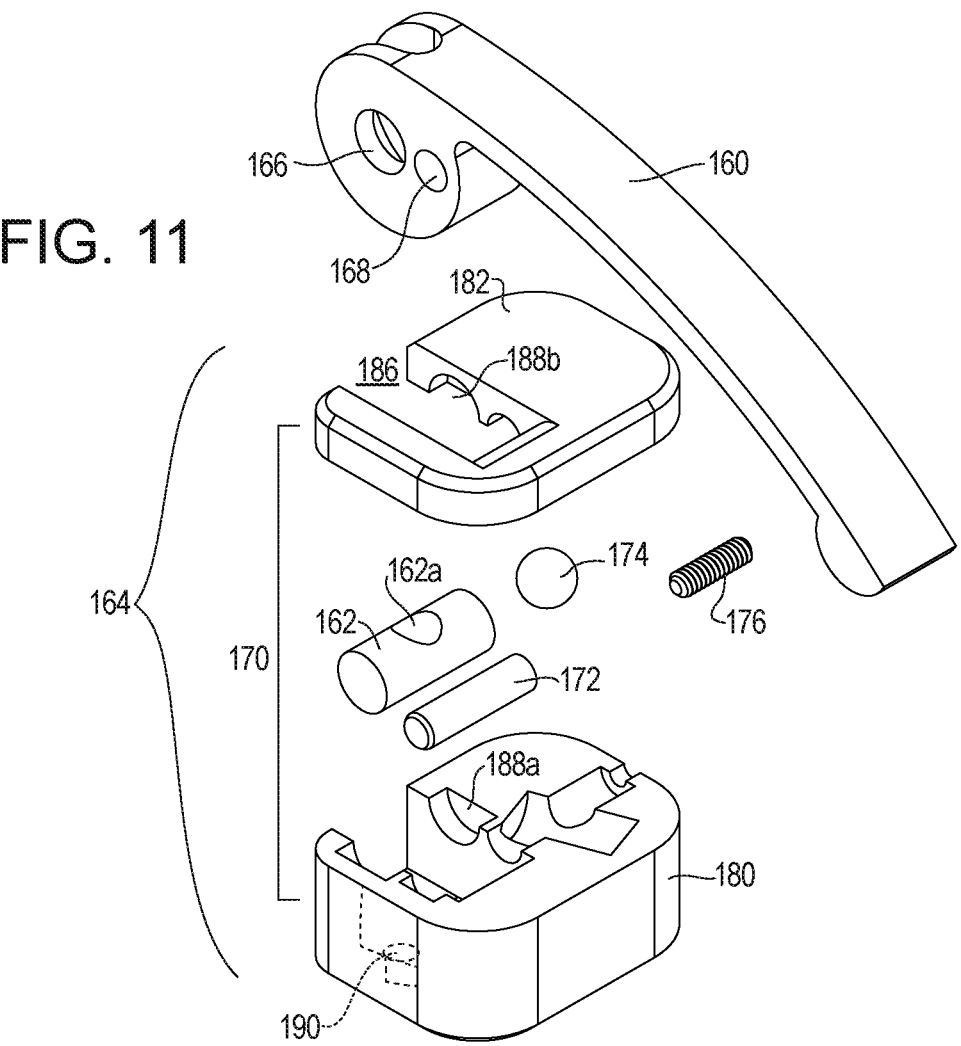
FIG. 11 is an exploded view of portion of skewer assembly incorporating the second example lock system.
Figure 12:
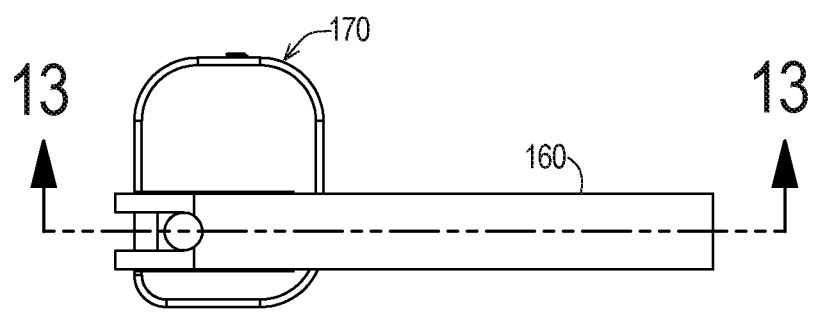
FIG. 12 is a front elevation view of the axle assembly incorporating the second example lock system.
Figure 13:
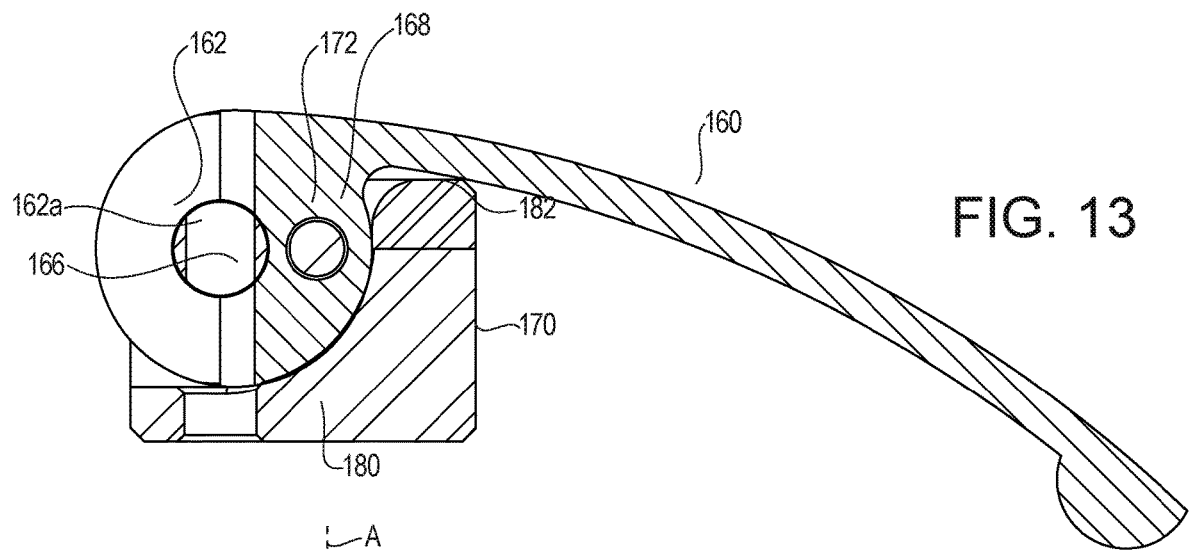
FIG. 13 is a section view taken along lines 13-13 in FIG. 12.
Figure 14:
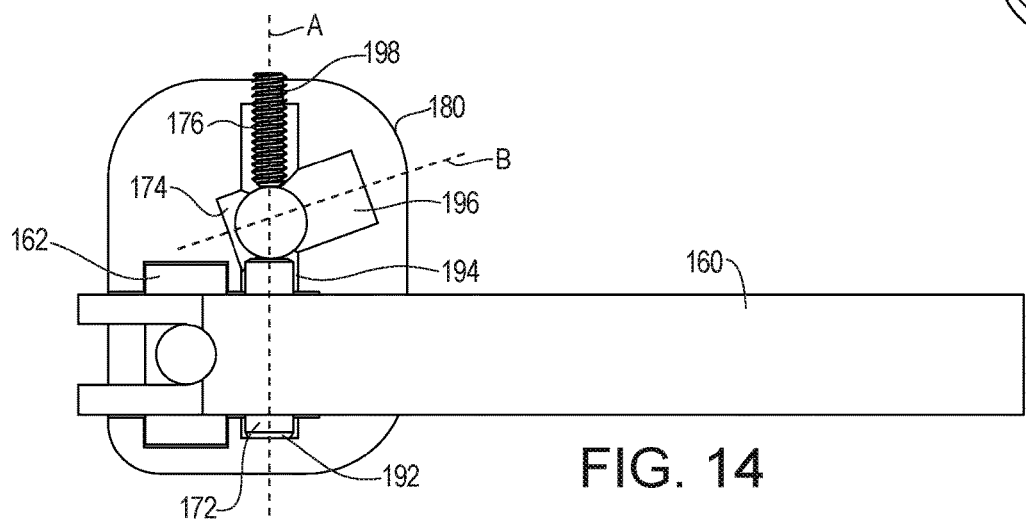
FIGS. 14-18 are side elevation views with a housing cap removed depicting a method of using the second example lock system.

FIG. 11 illustrates that the example front skewer assembly 150 comprises or incorporates a conventional quick release axle mechanism comprising a lever 160, an axle bolt (not shown in FIG. 11 for clarity), a lever pivot 162, and a lock assembly 164. The example quick release skewer assembly 150 is referred to as an open style quick release. The example seat skewer assembly 154 will include a clamp bolt instead of an axle bolt, and the clamp bolt will typically be sized and dimensioned for the particular clamp structure 156 defined by the example bicycle 120.

The example lever 160 defines a pivot opening 166 and a lock opening 168. FIG. 11 illustrates that the example lock assembly 164 comprises a housing 170 and a primary lock member 172. The example primary lock member 172 is a cylindrical member. The example lock opening 168 is cylindrical and has a diameter slightly larger than that of the primary lock member 172. The use of the lever 160, axle bolt, and lever pivot 162 to secure a wheel assembly to a bike frame is well-known and will not be described herein in detail beyond what is helpful for a complete understanding of the present invention.

Optionally, the example lock assembly 164 may also optionally be provided with a secondary lock member 174 and a tertiary lock member 176. The example secondary lock member 174 is a sphere or ball, and the example tertiary lock member 176 is a set screw. In this example, a diameter of a sphere forming the example secondary lock member 174 is smaller than a diameter of a cylindrical member forming the example primary lock member 172. The example housing 170 comprises a housing base 180 and a housing cap 182. At least one base projection (not shown) such as the base projections 84a and 84b described above extends from the housing base 180 to engage a portion of the fork 132 such that an orientation of the housing 170 is predetermined relative to an orientation of the bicycle 20. A lever notch 186 is formed in the example housing cap 182. When the housing base 180 and housing lid 182 are secured together, a first pivot cavity 188a is formed in the housing base 180, and a second pivot cavity 188b is formed in the housing cap 182.

When the housing base 180 and housing lid 182 are secured together, the example housing 170 defines a through hole 190, a first primary cavity 192, a second primary cavity 194, a secondary cavity 196, and a threaded hole 198. The example through hole 190 is cylindrical. The primary cavities 192 and 194 are at least partially cylindrical and are aligned along a primary axis A that extends at a right angle to the axis of the through hole 190. A diameter of the example first and second primary cavities 192 and 194 is slightly larger than the diameter of the primary lock member 172. The secondary cavity 196 defines a secondary axis B that is coplanar with and intersects the primary axis A at an intersection angle. The diameter of the example secondary cavity 196 is slightly larger than a diameter of the example secondary lock member 174. The diameter of the example secondary lock member 174 is, however, larger than a diameter of the primary cavities 192 and 194 so that the secondary lock member 174 may not move within the primary cavity 194 along the primary axis A. The threaded hole 198 is aligned with the primary axis A.

In use, the axle bolt is arranged to extend through the through hole 190 and through a skewer opening 162a in the lever pivot 162. The lever pivot 162 extends through the pivot opening 166 in the lever 160 and is supported by the first and second pivot cavities 188a and 188b to support the lever 160 for pivoting movement relative to the housing 170. The lever 160 otherwise engages the axle nut (not shown) in a conventional manner.

Figure 15:
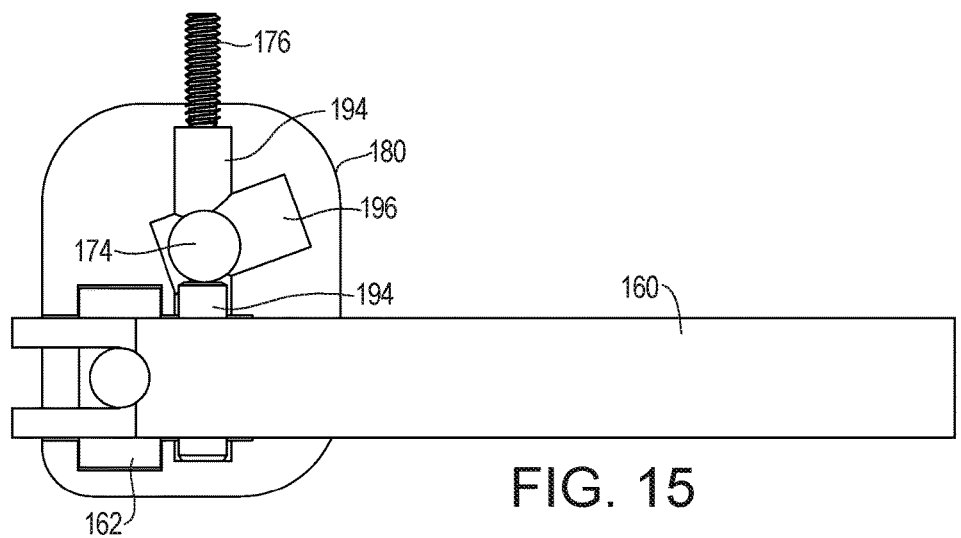
Figure 16:
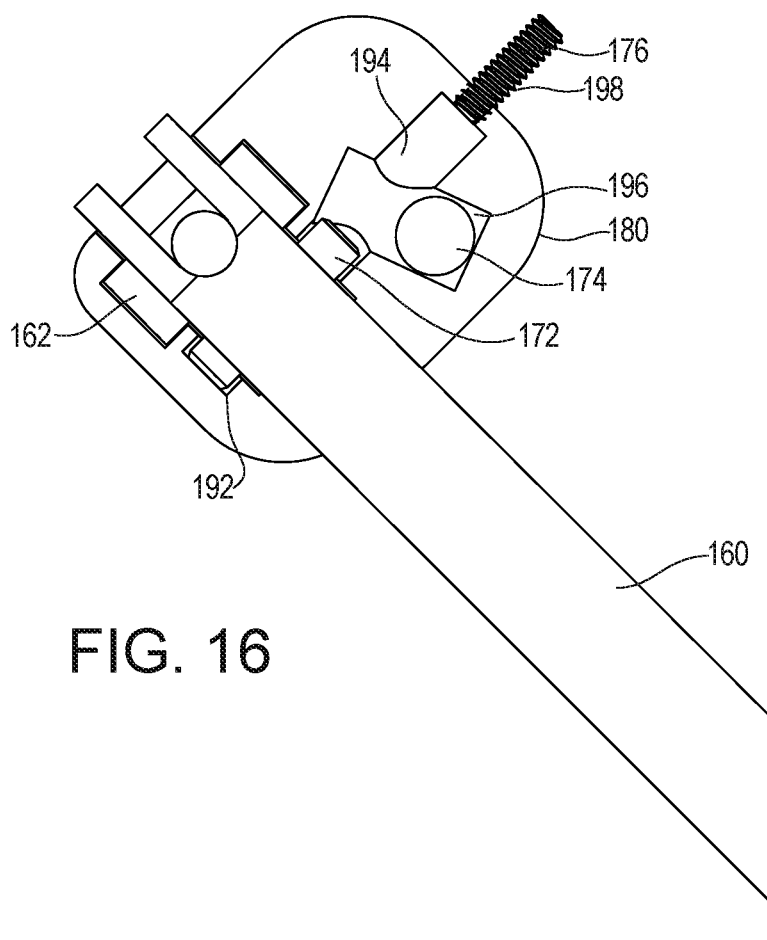
Figure 17:
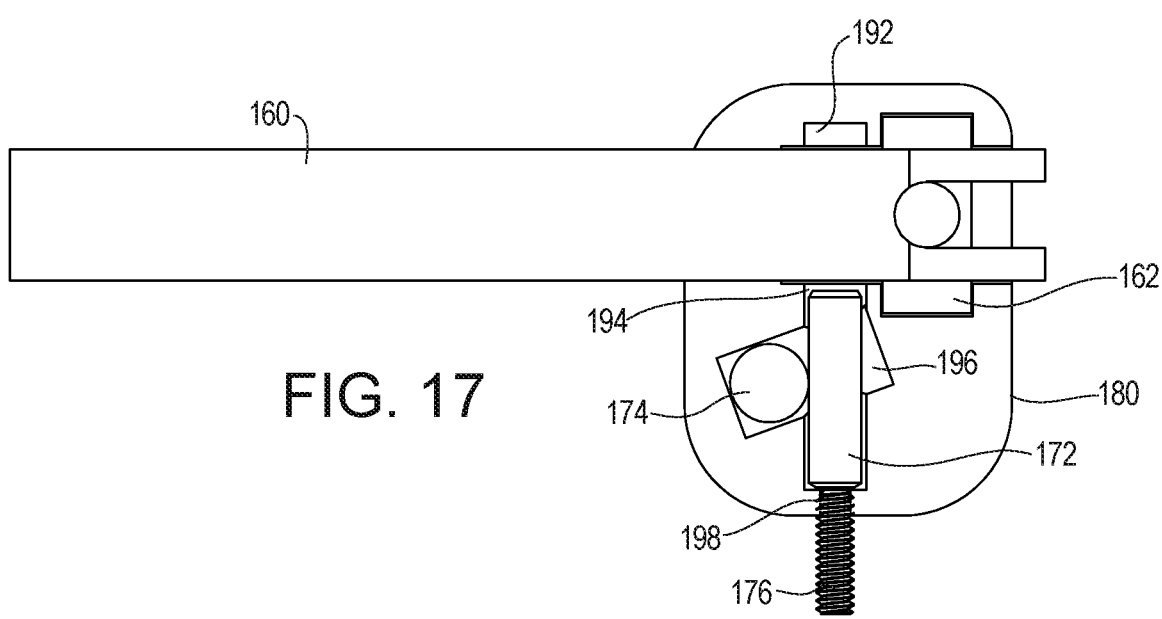
Figure 18:
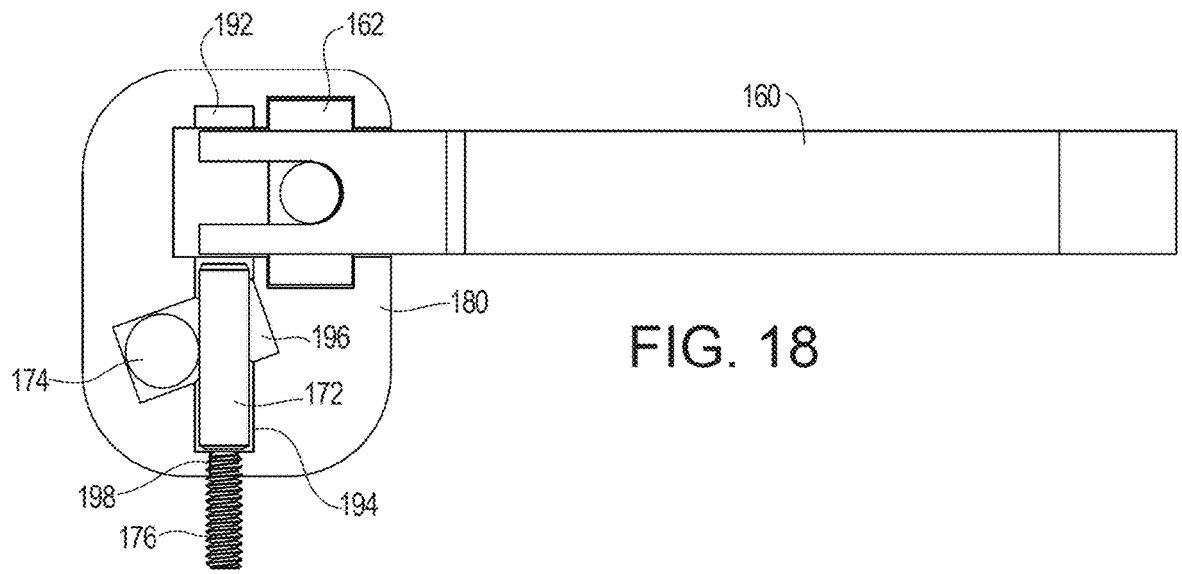

The example primary lock member 172 is arranged for sliding movement within the first and second primary cavities 192 and 194. When held in a primary locked position (e.g., by gravity) as shown in FIG. 15, the primary lock member 172 lies within the first and second primary cavities 192 and 194. With the lever 160 is in a tightened position as shown in FIGS. 13-17 and the lock housing 170 is upright (e.g., upright orientation), the primary lock member 172 also extends through the lock opening 168 in the lever 160 to prevent movement of the lever 160 relative to the housing 170. However, as shown for example in FIGS. 16 and 17, rotating or at least partly inverting the housing 170 (e.g., displacing from upright orientation) allows the primary lock member 172 to be moved (e.g., by gravity) from the primary locked position (FIG. 16) to a primary unlocked position (FIG. 17). In the primary unlocked position, the primary lock member 172 moves out of the lock opening 166 to allow normal pivoting movement of the lever 160 from the tightened position (e.g., FIG. 17) to a loosened position (FIG. 18). As is conventional, with the lever 160 in the loosened position, the wheel assembly 124 may be removed from the fork 132.

Accordingly, by at least partly inverting the bicycle 120 and thus the housing 170, the lever 160 may be rotated or pivoted from the tightened position to the loosened position to loosen the front skewer assembly 150 and thus allow removal of the front wheel assembly 124 from the fork 132. If the bicycle 120 cannot be inverted for some reason (e.g., chained to a bike rack), the primary lock member 172 prevents rotation of the lever 160 and thus inhibits removal of the front wheel assembly 124.

The example secondary lock member 174 is arranged for rolling movement within the secondary cavity 196. With the primary lock member 172 in the primary locked position, the secondary lock member 174 may be arranged (e.g., by gravity) in a secondary locked position (FIG. 15) in which the secondary lock member 174 prevents movement of the primary lock member 172 out of the primary locked position. If a bump or shock causes upward movement of the housing 170 and thus an upward force on the primary lock member 172, the secondary lock member 174 will prevent movement of the primary lock member 172 entirely out of the primary locked position such that rotation of the lever 160 still not allowed. When in the secondary locked position, the secondary lock member 174 thus maintains the primary lock member 172 within the primary locked position when subjected to unintentional or unintentional bumps or shocks. However, as the bicycle 120 is inverted, the secondary locked member 174 will move from the secondary locked position (FIG. 15) to a secondary unlocked position (FIG. 16) and eventually allow the primary lock member to move from the primary locked position to the primary unlocked position as described above. The intersection angle defined by the primary and secondary axes A and B is selected to require the secondary lock member 174 to move with rotation or inversion of the housing 170 from the secondary locked position to the secondary unlocked position before the primary lock member 172 is allowed to move from the primary locked position to the primary unlocked position.

The example tertiary lock member 176 is threaded into the threaded hole 198 for movement along the primary axis A. With the primary lock member 172 in the primary locked position and the secondary lock member 174 in the secondary locked position, the tertiary lock member 176 may be axially rotated for displacement into in a tertiary locked position (FIG. 14) in which the tertiary lock member 176 prevents movement of the secondary lock member 174 out of the secondary locked position. The tertiary lock member 176 embodied as a conventional set screw is axially rotated using a screw driver or the like to move the tertiary lock member 176 from the tertiary locked position (FIG. 14) to a tertiary unlocked position (FIG. 15). When tightened into the tertiary locked position, the tertiary lock member 176 positively holds the secondary lock member 174 in the secondary locked position and, in turn, the primary lock member 172 in the primary locked position. When backed away from the tertiary locked position into the tertiary unlocked position, the secondary lock member 174 may move from the secondary locked position into the second unlocked position as described above.

As mentioned above, both the secondary lock member 174 and the tertiary lock member 176 are optional, and at least a portion of the benefit of the second example skewer assemblies 150, 152, and 154 may be obtained without the use of the secondary and/or tertiary lock members 174 and 176. In addition, the second example skewer assemblies 150, 152, and 154 may be constructed with the tertiary lock member 176 and without the secondary lock member 174. In this case, the tertiary lock member 176 directly engages the primary lock member 172 instead of engaging the primary lock member 172 through a secondary lock member.

III. Third Example Skewer Assembly

Figure 19:
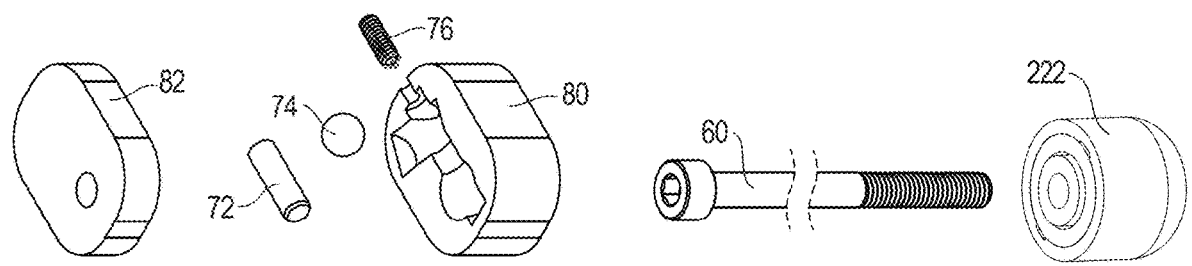
FIG. 19 is an exploded view of a third example skewer assembly using the first example lock system and an example slip nut assembly.
Figure 20:
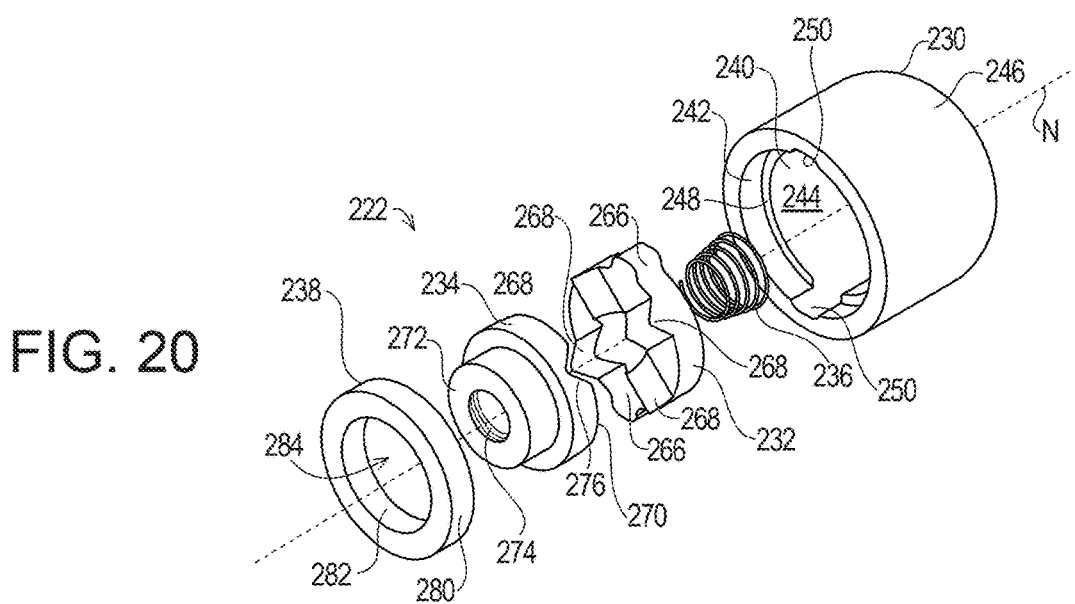
FIG. 20 is an exploded view of the example slip nut assembly.
Figure 21:
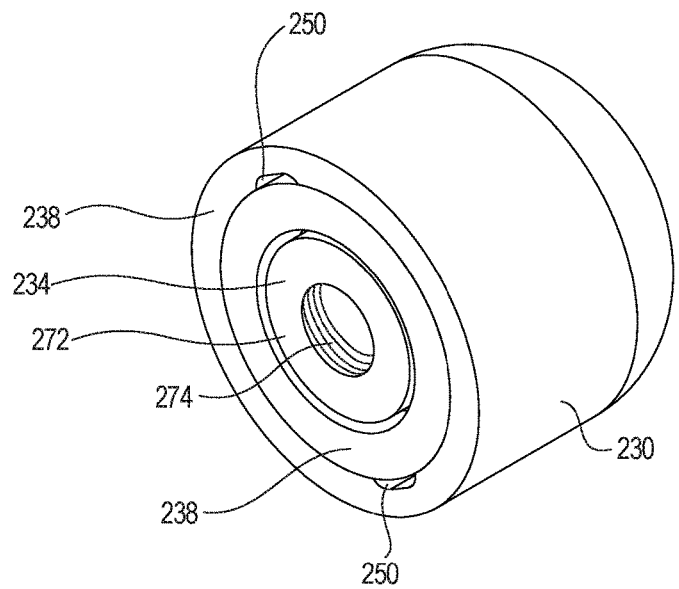
FIG. 21 is a perspective view of the example slip nut assembly.

Referring now to FIGS. 19-23 of the drawing, depicted therein is a third example skewer assembly 220 constructed in accordance with, and embodying, the principles of the present invention. FIG. 19 illustrates that the third example skewer assembly 220 is similar to the first example skewer assembly forming the skewer assemblies 50, 52, and 54 but employs a slip nut assembly 222 instead of a conventional nut such as the axle nut 62 described above.

The third example skewer may be used in place of any of the skewer assemblies 50, 52, 54, 150, 152, and 154 described above. Alternatively, the slip nut assembly 22 may be used instead of the conventional nut forming part of the second example skewer assembly forming the skewer assemblies 150, 152, and 154. The third example skewer assembly 220 will be described herein only to the extent that it differs from the first example skewer assembly forming the skewer assemblies 50, 52, and 54.

The example slip nut assembly 222 comprises a nut housing 230, a drive member 232, a nut member 234, a biasing member 236, and a retaining ring 238. The nut housing 230 defines a nut axis N.

The example nut housing 230 defines first and second wall inner surfaces 240 and 242 defining a housing cavity 244 and an outer wall surface 246. At least a portion of the first inner wall surface 240 defines a first diameter that is smaller than a second diameter of the second inner wall 242 such that an annular wall surface 248 extends between the first and second inner wall surfaces 240 and 242. A plurality of drive recesses 250 are formed in the inner surfaces 240 and 242. The example nut housing 230 defines two of the drive recesses 250 arranged on opposing sides of and generally extend parallel to the nut axis N.

The example drive member 232 defines a side surface 260, a first end surface 262, and a second end surface 264. A plurality of first drive projections 266 extend from the side surface 260, and a plurality of second drive projections 268 extend from the first end surface 262. The example drive member 232 defines two of the first drive projections 266, and the example first drive projections 266 are arranged on opposing sides of the drive member 232. The example drive member 232 defines four of the second drive projections 268 on the first end surface 262. The example drive projections 268 are spaced 90 degrees from each other about a longitudinal axis of the drive member 232.

The example nut member 234 defines an inner end surface 270 and an outer end surface 272. A threaded opening 274 is formed in the outer end surface 272, and a plurality of drive grooves 276 are formed in the inner end surface 270. The example threaded opening 274 is aligned with a longitudinal axis of the nut member 234. The example nut member 234 defines four of the drive grooves 276, and the example drive grooves 276 are spaced 90 degrees from each other about the longitudinal axis of the nut member 234.

The example biasing member 236 is a compression spring, but any structure capable of applying a biasing force as described may be used as the biasing member 236.

The example retaining ring 238 defines first and second wall surfaces 280 and 282. The second wall surface 282 defines a ring opening 284.

The example slip nut assembly 222 is assembled as follows. The biasing member 236 is arranged within the housing cavity 244. The drive member 232 is arranged within the housing cavity 244 such that the drive recesses 250 receive the first drive projections 266 and the second end surface 264 are in contact with the biasing member 236. The nut member 234 is arranged with the inner end surface 270 arranged such that the second drive projections 268 on the drive member 232 are received by the drive grooves 276 in the nut member 234. The retaining ring 238 is then arranged such that the first wall surface 280 thereof engages the second inner wall surface 242 on the example nut housing member 230. The longitudinal axes of the drive member 232, the nut member 234, the biasing member 236, and the retaining ring 238 are all substantially coaxially aligned with the nut axis N. At this point, the threaded opening 274 in the nut member 234 is accessible through the ring opening 284 defined by the retaining ring 238.

Once assembled, the example slip nut assembly 222 is used as follows. In the third example skewer assembly 220, the axle bolt 60 is inserted through the wheel hub and arranged within the dropouts 38 in a conventional manner. The slip nut assembly 222 is then arranged such that the threaded opening 274 receives the threaded end of the axle bolt 60. Rotation of the nut housing 230 is transferred by the drive recesses 250 within the hut housing 230 to the first drive projections 266 on the drive member 232 such that the axial rotation of the nut housing 230 is transferred to the drive member 232.

Figure 22:
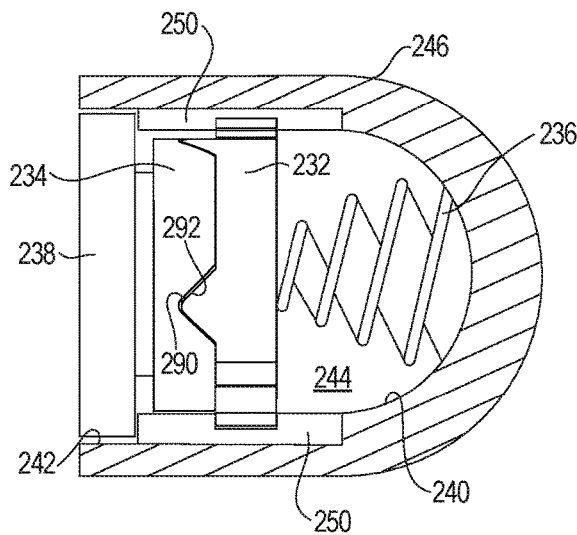
FIG. 22 is a partial section view of the example slip nut assembly in a drive configuration in which the slip nut assembly may be tightened onto an axle bolt of the third example skewer assembly.

Initially, the biasing member 236 applies a biasing force to the drive member 232 that forces the drive member towards the nut member 234 such that the drive grooves 276 in the nut member 234 receive the second drive projections 268 on the drive member 232 as shown in FIG. 22. With the drive grooves 276 received by the second drive projections 268, axial rotation of the drive member 232 is transferred to the nut member 234. The axle bolt 60 may thus be threaded at least partly into the threaded opening 274 by manual axial rotation of the nut housing 230.

Figure 23:
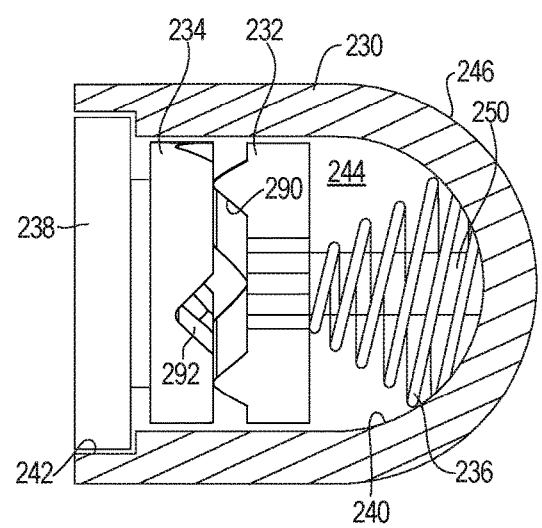
FIG. 23 is a partial section view of the example slip nut assembly in a slip configuration in which the slip nut assembly may not be further tightened onto or removed from the axle bolt of the third example skewer assembly.

At a certain point, resistance of the threading of the axle bolt 60 into the threaded opening 274 will increase to a point at which the biasing force applied by the biasing member 236 onto the drive member 232 will be insufficient to maintain the second drive projections 268 within the drive grooves 276. At this point, drive projections 268 will come out of the drive grooves 276 as shown in FIG. 23. After the threading resistance reaches a predetermined threshold, continued rotation of the nut housing 230 will simply cause the drive member 232 to rotate relative to the nut member 234 within the housing cavity 244 without causing rotation of the nut member 234. Instead, in the example slip nut assembly 222, the drive member 232 will slip over the nut member 234, causing a click sound as the drive projections 268 move out of and then reseat into the drive grooves 276 during each quarter turn of the nut housing 230.

Accordingly, the example slip nut assembly 222 allows the nut member 234 to be only partly tightened onto the axle bolt 60. The axle bolt 60 is may only be fully tightened by engaging a tool with the hex cavity 68 on the other end of the axle bolt 60 from the slip nut assembly 222. If the slip nut assembly 222 is used with the second example skewer assemblies 150, 152, or 154, the bolt may only be fully tightened by operating the lever 160. And once the axle bolt 60 is tightened, the axle bolt 60 may not be removed using the slip nut assembly 222. The third example skewer assembly 220 may thus be removed under normal circumstances by inverting the skewer assembly 220 such that the lock assembly 64 thereof is displaced to allow access to the hex cavity 68 or, in the case of the second example type of skewer assembly, by operating the lever 160.

The example drive projections 268 each define at least one angled surface 290, and the example drive grooves 276 each define at least one angled surface 292. The angle surfaces 290 and 292 are complementary such that threading resistance created by the engagement of the axle bolt 60 with the threaded opening 274 results in a linear force on the drive member 232 that opposes the biasing force applied by the biasing member 236. In the example slip nut assembly 222, the angle of the angled surfaces 290 and 292 and the bias force applied by the resilient member 236 are selected such that nut member 234 may be partly threaded onto the axle bolt 60 but, once the axle bolt 60 is tightened as described above, the nut member 234 may not be rotated to allow the skewer assembly 220 to be removed.

IV. Fourth Example Skewer Assembly

Referring now to FIGS. 24-28 of the drawing, depicted therein is a fourth example skewer assembly 320 constructed in accordance with, and embodying, the principles of the present invention. The fourth example skewer type may be used in place of any of the skewer assemblies 50, 52, 54, 150, 152, and 154 described above.

Figure 24A:
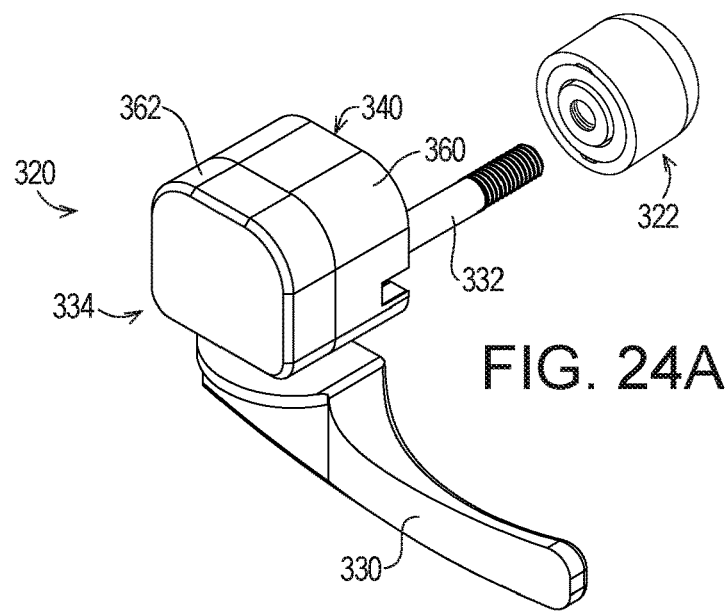
FIG. 24A is an exploded perspective view of a fourth example skewer assembly using a third example lock system.
Figure 24B:
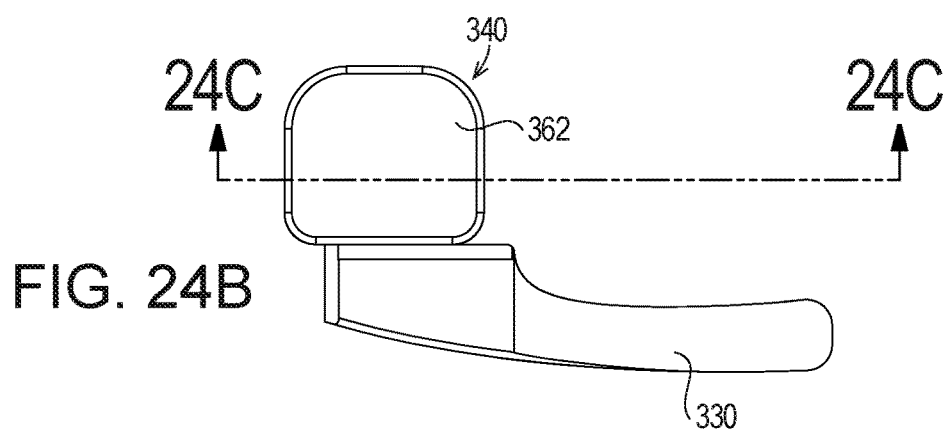
FIG. 24B is front elevation view of the fourth example skewer assembly.
Figure 24C:
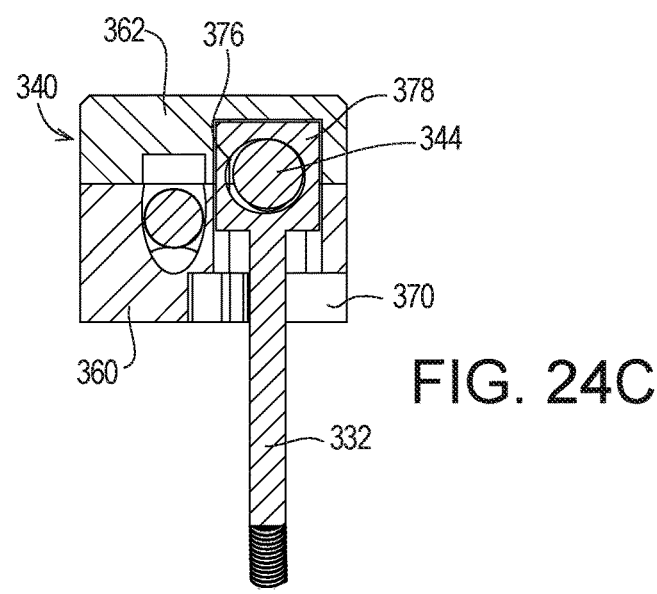
FIG. 24C is a section view taken along lines 24C and 24C in FIG. 24B.

FIG. 24 illustrates that the fourth example skewer assembly 320 employs a slip nut assembly 322 similar to the slip nut assembly 222 described above. The slip nut assembly 322 may be the same or similar to the example slip nut assembly 222 and will not be described herein in detail. Alternatively, a conventional axle nut may be used in place of the example slip nut assembly 222.

The fourth example skewer assembly 320 is generally similar to the second type of skewer assembly embodied in the skewer assemblies 150, 152, and 154 described above in that it incorporates a conventional quick release axle mechanism but employs what will be referred to herein as a closed lever action to tighten the skewer assembly 320.

Figure 25A:
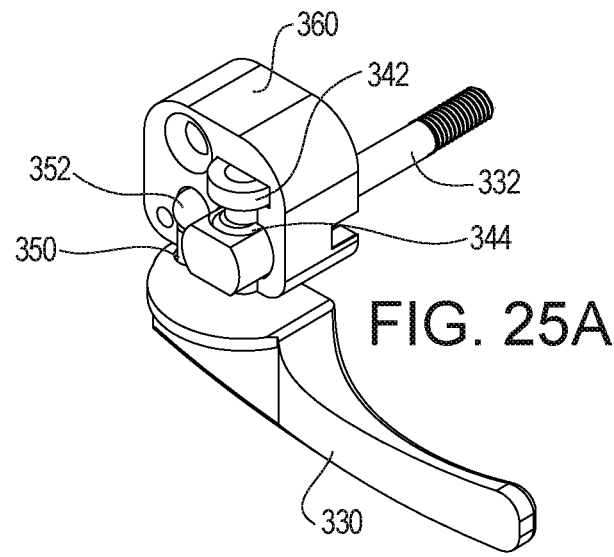
FIG. 25A is a perspective view of the third example lock system with a housing cap thereof removed to illustrate the primary and tertiary lock members thereof in a first configuration when the fourth example skewer system is upright and the lever is in a closed position.
Figure 25B:
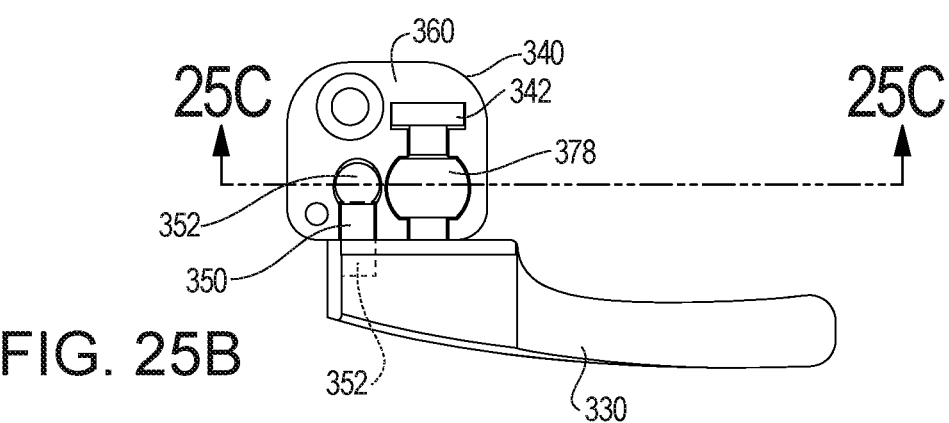
FIG. 25B is front elevation view similar to FIG. 25A.
Figure 25C:
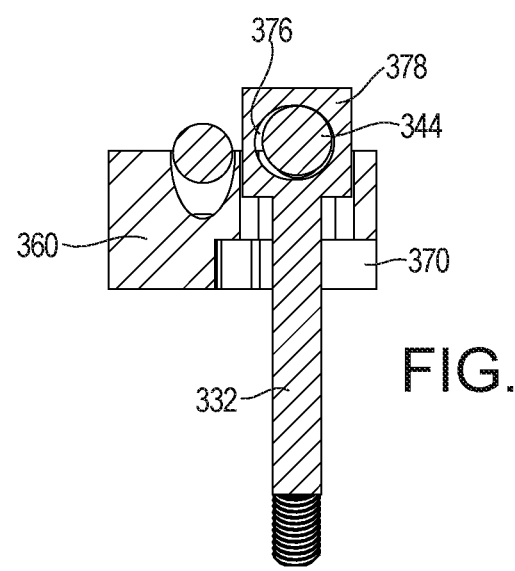
FIG. 25C is a section view taken along lines 25C and 25C in FIG. 25B.

As shown in FIGS. 24 and 25, the example skewer assembly 320 comprises a lever 330, an axle bolt 332, and a lock assembly 334. The example quick release skewer assembly 330 is referred to as closed style quick release. If used as a seat skewer assembly, the example skewer assembly 330 will include a clamp bolt instead of an axle bolt, and the clamp bolt will typically be sized and dimensioned for a particular clamp structure.

FIG. 24 illustrates that the example lock assembly 334 comprises a housing 340. The example lever 330 further defines a pivot portion 342 and a cam portion 344. The pivot portion 342 is contained within and engages the housing 340 such that rotation of the lever 330 causes offset rotation of the cam portion 344 about an axis of rotation of the pivot portion 342. The cam portion 344 is in turn connected to the axle bolt 332 such that offset rotation of the cam portion 344 causes displacement of the axial bolt 332 along its longitudinal axes. The use of the lever 330 to displace the axle bolt 332 is well-known and will not be described herein in further detail.

FIG. 25 illustrates that that the lock assembly 334 further comprises a primary lock member 350. The example primary lock member 350 is a cylindrical member. A lock opening 352 is formed in the lever 330. The example lock opening 352 is cylindrical and has a diameter slightly larger than that of the primary lock member 350. The example lock assembly 334 is also optionally provided with a secondary lock member 354. The example secondary lock member 354 is a sphere or ball. The diameter of the example secondary lock member 354 is smaller than a diameter of the example primary lock member 350. Although not visible, a tertiary lock member such as a set screw may be used in a manner similar to the tertiary lock member 176 described above.

The example housing 340 comprises a housing base 360 and a housing cap 362. At least one base projection (not shown) such as the base projections 84a and 84b described above extends from the housing base 360 to engage a portion of the fork 132 such that an orientation of the housing 340 is predetermined relative to an orientation of the bicycle 20.

When the housing base 360 and housing lid 362 are secured together, the example housing 340 defines an axle opening 370, a primary cavity 372, a secondary cavity 374, and, if a tertiary lock member is used, a threaded hole (not visible). A diameter of the example primary cavity 372 is slightly larger than the diameter of the primary lock member 350. The secondary cavity 374 intersects the primary cavity 372 at an intersection location and intersection angle. The diameter of the example secondary cavity 374 is slightly larger than a diameter of the example secondary lock member 354. The diameter of the example secondary lock member 354 is, however, larger than a diameter of the primary cavity 372 so that the secondary lock member 354 may not move within the primary cavity 372.

In use, the axle bolt 332 is arranged partly within the axle opening 370 and such that the cam portion 344 of the lever 330 is within a cam opening 376 formed in a head portion 378 of the axle bolt 332.

Figure 26A:
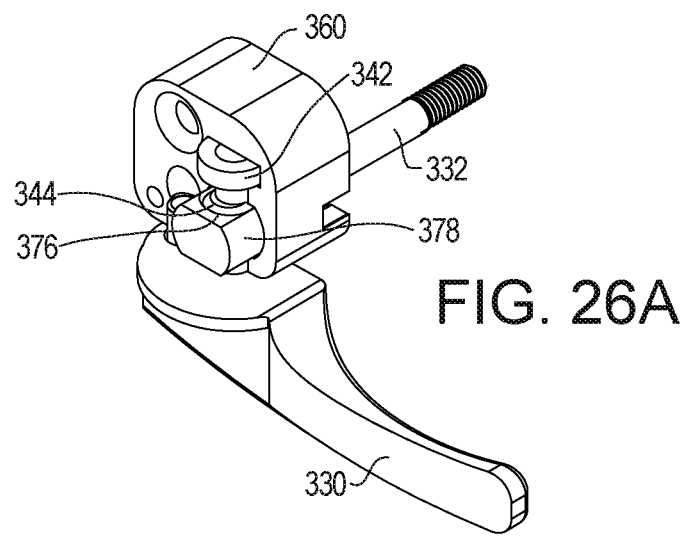
FIG. 26A is a perspective view of the third example lock system with a housing cap thereof removed to illustrate the primary and tertiary lock members thereof in a second configuration when the fourth example skewer system begins to be inverted and the lever is in the closed position.
Figure 26B:
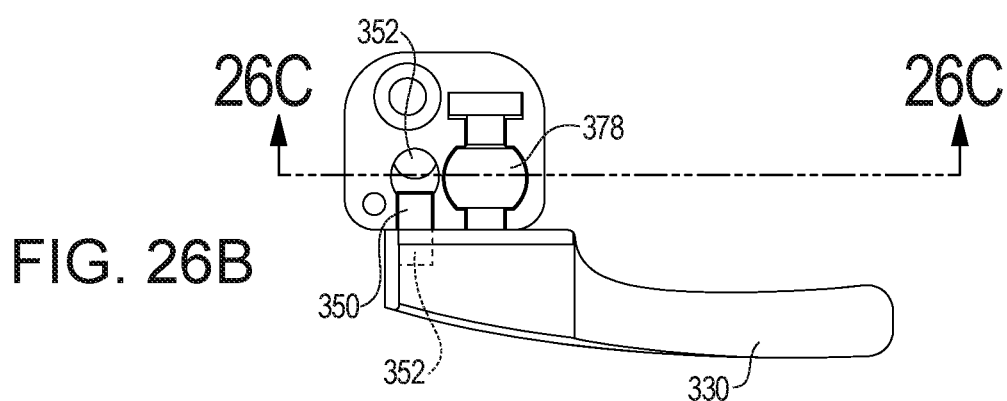
FIG. 26B is front elevation view similar to FIG. 26A.
Figure 26C:
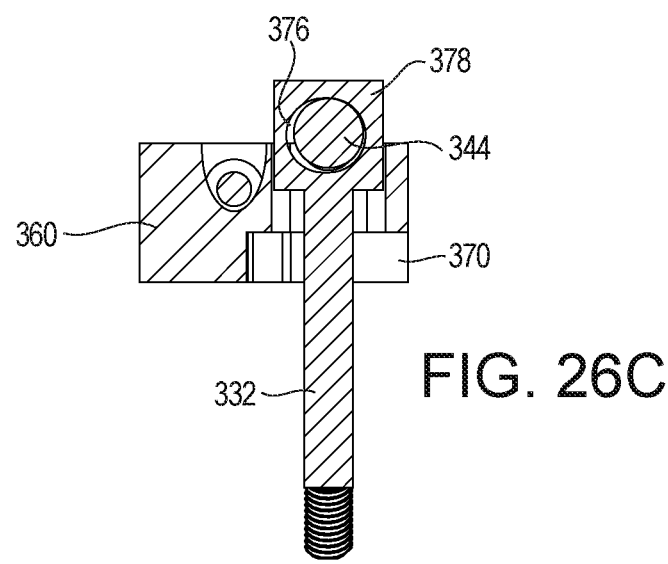
FIG. 26C is a section view taken along lines 26C and 26C in FIG. 26B.

The example primary lock member 350 is arranged for sliding movement within the primary cavity 372. When held in a primary locked position as shown in FIGS. 25B and 26B, typically by gravity when the fourth example skewer system 320 is upright, the primary lock member 350 lies partly within the primary cavity 372. With the lever 330 in a tightened position as shown in FIGS. 25-26 and the lock housing 340 upright, the primary lock member 350 also extends through the lock opening 352 in the lever 330 to prevent movement of the lever 330 relative to the housing 340.

Figure 27A:
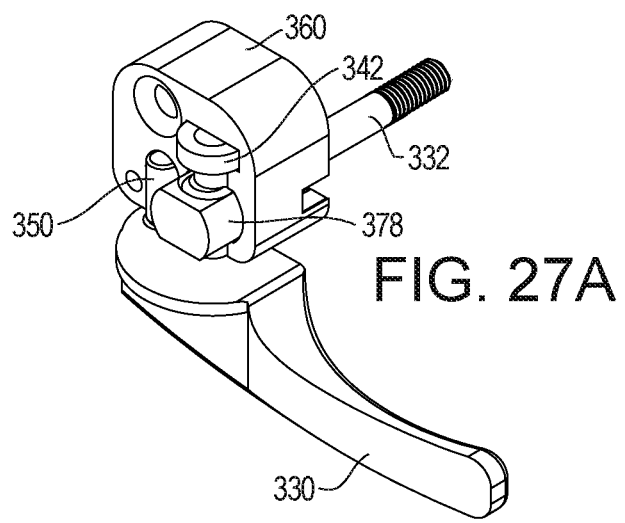
FIG. 27A is a perspective view of the third example lock system with a housing cap thereof removed to illustrate the primary and tertiary lock members thereof in a third configuration when the fourth example skewer system is fully inverted and the lever is in the closed position.
Figure 27B:
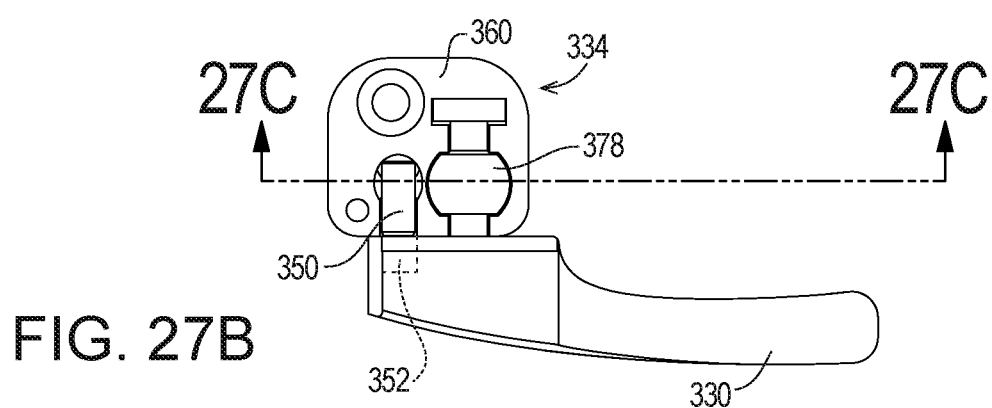
FIG. 27B is front elevation view similar to FIG. 27A.
Figure 27C:
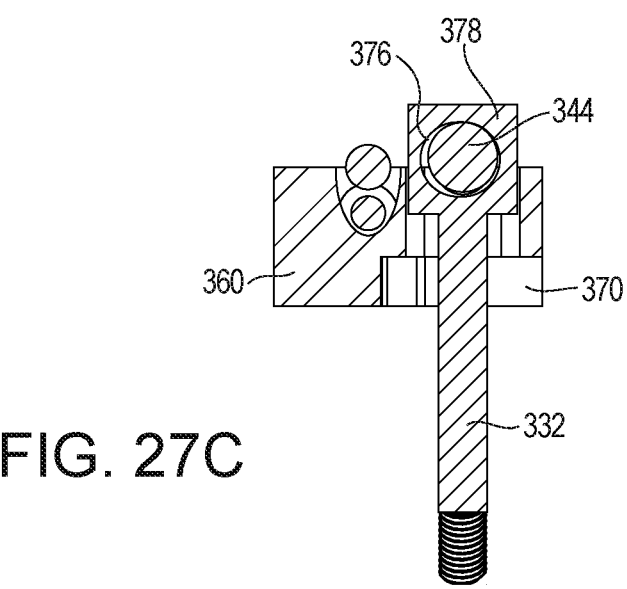
FIG. 27C is a section view taken along lines 27C and 27C in FIG. 27B.

However, as shown for example in FIGS. 27 and 28, rotating or at least partly inverting the housing 340 (typically by inverting the bicycle) allows the primary lock member 350 to be moved (e.g., by gravity) from the primary locked position (FIGS. 25 and 26) to a primary unlocked position (FIGS. 27 and 28). In the primary unlocked position, the primary lock member 350 moves out of the lock opening 352 to allow normal pivoting movement of the lever 330 from the tightened position (e.g., FIGS. 25-27) to a loosened position (FIG. 28). As is conventional, with the lever 330 in the loosened position, the component (e.g., wheel assembly, seat) may be removed.

Accordingly, by at least partly inverting the bicycle and thus the housing 340, the lever 330 may be rotated or pivoted from the tightened position to the loosened position to loosen the fourth example skewer assembly 320 and thus allow removal of the component (e.g., wheel assembly, seat). If the bicycle 120 cannot be inverted for some reason (e.g., chained to a bike rack), the primary lock member 350 prevents rotation of the lever 330 and thus inhibits removal of the component (e.g., wheel assembly, seat).

The example secondary lock member 354 is arranged for rolling movement within the secondary cavity 374. With the primary lock member 350 in the primary locked position, the secondary lock member 354 may be arranged (e.g., by gravity) in a secondary locked position (FIG. 25) in which the secondary lock member 354 prevents movement of the primary lock member 350 out of the primary locked position. If a bump or shock causes upward movement of the housing 340 and thus an upward force on the primary lock member 350, the secondary lock member 354 will prevent movement of the primary lock member 350 entirely out of the primary locked position such that rotation of the lever 330 still not allowed. When in the secondary locked position, the secondary lock member 354 thus maintains the primary lock member 350 within the primary locked position when subjected to unintentional or unintentional bumps or shocks.

However, as the bicycle 120 is inverted, the secondary locked member 344 will move from the secondary locked position (FIG. 25) to a secondary unlocked position (FIGS. 26-28) and eventually allow the primary lock member to move from the primary locked position to the primary unlocked position as described above. The intersection angle defined by the primary and secondary cavities 372 and 374 is selected to require the secondary lock member 354 to move with rotation or inversion of the housing 340 from the secondary locked position to the secondary unlocked position before the primary lock member 346 is allowed to move from the primary locked position to the primary unlocked position.

What is claimed is:

1. A skewer assembly for securing a component to a first portion of a bicycle comprising:
    a bolt for detachably attaching the component to the first portion of the bicycle;
    a housing supported relative to the bolt;
    a first lock member supported for movement relative to the housing; and
    a second lock member supported for movement relative to the housing; wherein
    when the skewer assembly is in an upright orientation, gravity acts on
        the second lock member such that the second lock member inhibits movement of the first lock member, and
        the first lock member such that the first lock member is arranged relative to the housing to inhibit tightening of the bolt; and
    when the skewer assembly is at least partly displaced from the upright orientation, gravity displaces
        the second lock member to allow movement of the first lock member, and
        the first lock member to allow tightening of the bolt.

2. A skewer assembly as recited in claim 1, in which the skewer assembly is at least partly inverted to displace the skewer assembly at least partly from the upright orientation.

3. A skewer assembly as recited in claim 1, in which:
    the bolt defines a head portion; and
    the first lock member inhibits access to the head portion of the bolt when the skewer assembly is in the upright orientation; and
    the first lock member allows access to the head portion of the bolt when the skewer assembly is sufficiently displaced from the upright orientation.

4. A skewer assembly as recited in claim 1, further comprising a lever operatively configured to tighten the bolt, in which:
    the first lock member inhibits movement of the lever when the skewer assembly is in the upright orientation; and
    the first lock member allows movement of the lever when the skewer assembly is sufficiently displaced from the upright orientation.

5. A skewer assembly as recited in claim 1, in which, when the skewer assembly is displaced from at least partly out of the upright orientation into the upright orientation, gravity displaces
the first lock member to inhibit tightening of the bolt; and
the second lock member to inhibit movement of the first lock member.

6. A skewer assembly as recited in claim 1, further comprising a third lock member, where the third lock member is supported by the housing such that
when the skewer assembly is in an upright orientation, the third lock member inhibits movement of the first lock member; and
when the skewer assembly is at least partly displaced from the upright orientation, the second lock member is displaced to allow movement of the first lock member.

7. A skewer assembly as recited in claim 1, further comprising a slip nut assembly comprising:
a housing;
a drive member;
a nut member; and
a biasing member; whereby
the nut member engages the bolt; and
the biasing member is arranged to apply a biasing force on the drive member such that rotation of the housing is transmitted to the nut member through the drive member when threading resistance between the nut member and the bolt is below a predetermined threshold.

8. A skewer assembly as recited in claim 1, in which:
the component is at least one of a wheel and a seat; and
the first portion of the bicycle is at least one of a fork and a frame of the bicycle.

9. A skewer assembly as recited in claim 1, further comprising a base projection extending from the housing, where the base projection engages at least a second portion of the bicycle to inhibit rotation of the housing relative to the first portion of the bicycle.

10. A method of securing a component to a portion of a bicycle comprising the steps of:
providing a bolt for detachably attaching the component to the portion of the bicycle;
supporting a housing relative to the bolt;
supporting a first lock member with the housing for movement relative to the housing;
supporting a second lock member for movement relative to the housing;
arranging the bicycle to place the housing in an upright orientation such that gravity acts on
the second lock member such that the second lock member inhibits movement of the first lock member, and
the first lock member is positioned relative to the housing to inhibit tightening of the bolt; and
arranging the bicycle to displace the housing at least partly out of the upright orientation such that gravity displaces
the second lock member relative to the housing to allow movement of the first lock member, and
the first lock member relative to the housing to allow tightening of the bolt.

11. A method as recited in claim 10, in which the step of displacing the housing at least partly from the upright orientation comprises the step of at least partly inverting the housing.

12. A method as recited in claim 10, in which:
the bolt defines a head portion; and
the first lock member inhibits access to the head portion of the bolt when the housing is in the upright orientation; and
the first lock member allows access to the head portion of the bolt when the housing is sufficiently displaced from the upright orientation.

13. A method as recited in claim 10, further comprising the step of operatively configuring a lever to tighten the bolt, in which:
the first lock member inhibits movement of the lever when the housing is in the upright orientation; and
the first lock member allows movement of the lever when the housing is sufficiently displaced from the upright orientation.

14. A method as recited in claim 10, further comprising the step of:
arranging the bicycle to displace the housing from at least partly out of the upright orientation into the upright orientation such that gravity displaces
the first lock member relative to the housing to inhibit tightening of the bolt, and
the second lock member relative to the housing to inhibit movement of the first lock member.

15. A method as recited in claim 10, further comprising the step of supporting a third lock member with the housing such that:
when the housing is in an upright orientation, the third lock member inhibits movement of the first lock member; and
when the housing is at least partly displaced from the upright orientation, the second lock member is displaced to allow movement of the first lock member.

16. A method as recited in claim 15, in which the third lock member engages the second lock member to inhibit movement of the first lock member.

17. A bicycle assembly comprising:
a frame;
a fork;
a front wheel;
a rear wheel;
a seat;
a first bolt for detachably attaching the front wheel to the fork;
a second bolt for detachably attaching the rear wheel to the frame;
a third bolt for detachably attaching the seat to the frame;
at least one housing supported relative to at least one of the first bolt, the second bolt, and the third bolt;
a first lock member supported for movement relative to the at least one housing; and
a second lock member, where the second lock member is supported for movement relative to the housing such that; wherein
when the bicycle assembly is in an upright orientation, gravity acts on
the second lock member such that the second lock member inhibits movement of the first lock member, and
the first lock member such that the first lock member inhibits tightening of the bolt; and
when the bicycle assembly is at least partly displaced from the upright orientation, gravity displaces
the second lock member to allow movement of the first lock member, and
the first lock member to allow tightening of the bolt.

18. A housing as recited in claim 17, in which:

when the bicycle assembly is displaced from at least partly out of the upright orientation into the upright orientation, gravity displaces the first lock member to inhibit tightening of the bolt, and the second lock member to inhibit movement of the first lock member.

19. A housing as recited in claim 18, further comprising a third lock member, where the third lock member is supported by the housing such that when the bicycle assembly is in an upright orientation, the third lock member inhibits movement of the first lock member; and when the bicycle assembly is at least partly displaced from the upright orientation, the second lock member is displaced to allow movement of the first lock member.

* * * * *